United States Patent Office 2,837,577
Patented June 3, 1958

2,837,577

PROCESS FOR THE ISOMERIZATION OF UNSATURATED ALCOHOLS AND THEIR ESTERS

Bruno Blaser and Werner Stein, Dusseldorf, Germany, assignors to Henkel & Cie. G. m. b. H., Dusseldorf-Holthausen, Germany, a corporation of Germany No Drawing. Application May 23, 1955, Serial No. 510,558. In Germany July 5, 1949

Public Law 619, August 23, 1954
Patent expires July 5, 1969

7 Claims. (Cl. 260—642)

This invention relates to a process for the isomerization of unsaturated alcohols and their esters in the presence of cobalt carbonyl and in an atmosphere of carbon monoxide.

More particularly, we have found that valuable isomers of natural and synthetic unsaturated alcohols and their esters can be formed by heating unsaturated alcohols or their esters in a substantially oxygen-free atmosphere of carbon monoxide at elevated pressures and in the presence of cobalt carbonyl, while maintaining the carbon monoxide pressure in the reaction vessel at a value where the carbonyl remains stable and does not decompose.

The end products obtained by the treatment in accordance with our invention are distinguished over the starting materials sometimes by a mere change in physical properties, but in many cases also by a change in the chemical as well as the physical properties. The nature and extent of the change depends largely upon the molecular size of the unsaturated alcohol used as the starting material and the reaction conditions.

The theory of the isomeric transformation according to the present invention is not precisely known, but there are certain indications that the presence of cobalt carbonyl probably induces a migration of the double bond within the molecule of the unsaturated alcohol. The products formed thereby, which are isomers of the alcohols used as starting materials, differ from these starting materials primarily only in their physical properties. However, in migrating within the alcohol molecule, the double bond may take up a position whereby a vinyl group of the formula

—CH=CH—OH is formed at the end of the alcohol molecule. This vinyl grouping is an isomer of the aldehyde grouping having the formula

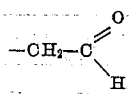

The aldehyde then may react, through aldol-condensation or other condensation reactions, with other aldehyde molecules to form high-molecular compounds which, after splitting off water, contain double bonds. Example III below, which shows the formation of propionaldehyde and methyl-ethyl-acrolein, gives substance to this theory. A further confirmation of this theory is the fact that in the treatment of unsaturated alcohol esters according to our invention, the esters do not undergo a change in chemical properties, which can readily be explained by the blocking of the hydroxyl group. The double bond is merely isomerized, whereby the melting point of the ester is changed, in most cases increased; see, for example, the difference in melting points between the starting material and the end product in Example IV below. The above-propounded theory is given only for the purpose of explanation and must not be considered as the only conclusive theory upon which the present isomerization process is based.

The process in accordance with the present invention, therefore, is of great importance and usefulness in cases where it is desired to change the melting point of unsaturated alcohols without, however, altering their chemical properties. In such cases, the esters of unsaturated alcohols are treated in accordance with the present process, and upon completion of the treatment, the carboxylic acid radical of the ester is split off and the alcohol is recovered.

Suitable unsaturated alcohols which may be treated according to the process of our invention are those having at least three carbon atoms, preferably from 3 to 26 carbon atoms, in the molecule. Particularly suitable were monohydroxy unsaturated aliphatic alcohols having a primary hydroxyl group in the molecule.

The isomerization reaction according to our invention takes place at a temperature of at least 100° C., but temperatures above 130° C. are preferred. The highest operative temperature is that at which the alcohol used, or its isomer, begins to decompose. The upper temperature limit of the reaction is further determined by that temperature at which the decomposition of cobalt carbonyl into carbon monoxide and metallic cobalt can no longer be prevented by high carbon monoxide pressures within the limitations of industrial apparatus. Thus, the isomerization reaction according to the present invention is usually carried out at a temperature not exceeding 300° C., and preferably at 250° C. or below. In most cases, temperatures between 150° C. and 200° C. are sufficient. However, the higher the temperature, the shorter the time necessary to bring about the desired isomerization.

The pressure of carbon monoxide which must be maintained in the reaction vessel during the isomerization of unsaturated alcohols in accordance with the present invention must always be higher than the pressure developed by the decomposition of cobalt carbonyl into cobalt and carbon monoxide. At 150° C. this pressure is about 30 kg./cm.$^2$. It is preferred, however, to maintain a higher pressure, for example, 100 kg./cm.$^2$.

Unsaturated alcohols suitable for treatment within the scope of the present invention are those alcohols which have at least one olefinic double bond in the molecule. The process is applicable to unsaturated alcohols having a low- or high-molecular weight, regardless of whether such alcohols have been produced by synthesis or by any of the well-known processes from natural products. For example, oleyl alcohol, one of the most important high-molecular alcohols, as well as other higher unsaturated alcohols, occurs in sperm oil in the form of esters and can readily be recovered therefrom. Furthermore, unsaturated alcohols adapted for treatment according to the present invention, particularly those having from 10 to 20 carbon atoms in the molecule, can be obtained synthetically by reduction of the corresponding unsaturated fatty acids or their esters with metallic sodium. In many instances the unsaturated alcohols are obtained in admixture with saturated alcohols. Such mixtures need not be separated prior to treatment according to the present process, but for economical operation, the mixture should contain at least 50 mol percent of unsaturated alcohols, preferably from 70 to 100 mol percent.

The amount of cobalt carbonyl used may vary within wide limits, but the minimum amount should not be less than 0.1% by weight, based upon the weight of alcohol to be isomerized. The range of 0.5 to 2% is preferred, however, and in general it is not necessary to provide more than 5% by weight based upon the weight of the total mixture. The cobalt carbonyl may be added to the reaction mixture as such, or it may be permitted to form during the reaction. In the latter case, the reaction mixture is merely admixed with the proper amount of metallic cobalt, preferably in finely divided form, which then combines with the carbon monoxide in the reaction vessel at the reaction temperature to form the cobalt carbonyl catalyst. It is particularly advantageous to provide the cobalt in the form of an active, freely divided deposit on inert carrier substances, such as kieselguhr, for example.

The isomerization reaction which takes place in the presence of carbon monoxide under pressure and at elevated temperatures, as above indicated, may be carried out as a continuous process or as a batch process on pressure-resistant reaction vessels, such as agitator autoclaves, rotary autoclaves and shaker autoclaves, or in pressure-resistant tubular systems. The cobalt carbonyl dissolves in the reaction mixture, and may readily be removed therefrom at the completion of the process by physical or chemical methods, such as, for example, by heating or washing of the raw reaction product with acids or salt solutions, or by adsorption on substances, having active surfaces, such as activated carbon or activated silica.

As previously pointed out, the present process is applicable to unsaturated alcohols as well as their carboxylic acid esters. Since the carboxylic acid radical of the ester does not enter into the reaction and remains unchanged, the isomerization can be carried out with any desired carboxylic acid ester of the unsaturated alcohol. It is preferred, however, to employ the esters of low-molecular aliphatic, cycloaliphatic or aromatic carboxylic acids having from 1 to 8 carbon atoms in the molecule. In certain particular cases, however, it is advantageous to apply the process according to the present invention to unsaturated alcohol esters of higher carboxylic acids having up to 25 carbon atoms in the carboxylic acid radical.

The process in accordance with the present invention differs from the well-known oxo process and its variations, in which unsaturated hydrocarbons are heated in the presence of cobalt catalysts and carbon monoxide, in that the other reaction component, namely a compound or substance having shiftable hydrogen atoms in the molecule, such as hydrogen, water, carboxylic acids and amides, which is an essential and indispensable part of the so-called oxo-synthesis, is absent from the reaction mixture. In the present process, also, any other material which would react under the chosen conditions with any of the compounds present in the reaction vessel or which would serve as catalysts for other types of reactions, such as halides of metals of the iron group, particularly halides of iron, cobalt, nickel or boron, are excluded. In other words, the isomerization of unsaturated alcohols and their esters in accordance with our invention is based exclusively on an internal rearrangement within the sole starting material rather than on a reaction between two or more reaction components.

The following examples will further illustrate our invention and enable others skilled in the art to understand the invention more completely. It is understood, however, that the present invention is not limited to these examples.

*Example I*

63 grams of sperm oil alcohols were placed into a shaker autoclave having a net volume of 100 cc. The sperm oil alcohol mixture had the following characteristic values:

| | |
|---|---|
| Iodine number | 69 |
| Hydroxyl number | 202 |
| CO number | 3 |
| Saponification number | 9 |
| Melting point | °C__ +18 |

7 grams of a cobalt catalyst were added to the alcohol mixture. The catalyst had the following composition ratio in parts by weight:

$Co:ThO_2:MgO:kieselguhr = 100:5:6:200$

The autoclave was then flushed repeatedly with carbon monoxide to displace the air therein. The autoclave was then closed and carbon monoxide was introduced until the pressure reached 100 kg./cm.$^2$. Subsequently the contents of the autoclave were heated to 180° C. and maintained at that temperature for 6 hours, accompanied by vigorous shaking of the autoclave. The internal pressure reached 150 kg./cm.$^2$. At the end of 6 hours the contents were allowed to cool. Thereafter, the reaction mixture was filtered to remove the cobalt catalyst composition, and the cobalt carbonyl which formed during the treatment and dissolved in the reaction mixture was removed therefrom by washing with a 5% solution of sulfuric acid. The acid product was then washed with water until neutral. The characteristic values of the undistilled raw product were as follows:

| | |
|---|---|
| Hydroxyl number | 79 |
| Iodine number | 50 |
| Saponification number | 15 |
| CO number | 40 |

The starting material and the treated product were divided into 4 quantitatively equal fractions. The iodine number and the melting point of each of these fractions were determined. A further sample of the treated product was distilled into 2 fractions (0–40% and 41–93%) and the hydroxyl number of each fraction was determined. The values obtained are shown in the following table:

| Fraction | Boiling Pt. at 3.5 mm. Hg before and after Co-carbonyl treatment | | Characteristic Values of Fractions before and after Co-carbonyl treatment | | | | |
|---|---|---|---|---|---|---|---|
| | | | Iodine No. | | Melting Pt. | | Hydroxyl No. After |
| | Before | After | Before | After | Before | After | |
| At B. P. | 83 | 107 | 47 | 18 | 29 | 7–8 | |
| 10% | 147 | 155 | | | | | |
| 20% | 162 | 172 | 64 | 33 | 29 | 31–32 | 163 |
| 30% | 169 | 183 | | | | | |
| 40% | 173 | 215 | 80 | 70 | 20 | 30–31 | |
| 50% | 177 | 292 | | | | | |
| 60% | 179 | 300 | | | | | |
| 70% | 183 | 307 | 96 | 64 | 18 | 23 | 26 |
| 80% | 187 | 313 | | | | | |
| 90% | 196 | 334 | | | | | |
| At end of boiling | 220 (98%) | 342 (93%) | | | | | |

*Example II*

60 grams fatty alcohols and sperm oil were heated at 180–190° C. for 7 hours in an atmosphere of carbon monoxide at a pressure of 150 kg./cm.$^2$ and in the presence of 5 grams of the same cobalt catalyst as described in Example I. After filtering and removal of the cobalt carbonyl as in Example I, a raw product having the following characteristic values was obtained:

Iodine number _____ 64
Hydroxyl number _____ 138
CO number _____ 50
Melting point _____ °C__ +29

The characteristic values of the untreated starting material were:

Iodine number _____ 92
Hydroxyl number _____ 208
Melting point _____ °C__ +17

By distillation of the raw product it was found that the starting alcohols had to a large extent been transformed into a higher-molecular product, mostly into a product having twice the molecular weight of the starting material. The low-boiling fraction, namely that fraction passing over after oleyl alcohol, had a melting point of 34.5° C. as compared to 16° C., the melting point of the corresponding fraction in the starting material.

Example III 500 cc. of allyl alcohol were heated in a rotary autoclave for 4 hours at 170° C. in an atmosphere of carbon monoxide at a pressure of 140 kg./cm.$^2$ and in the presence of 4% by weight of the cobalt catalyst as described in Example I. After cooling, the raw product was filtered and then distilled without further treatment in a fractionating column. The following fractions were obtained:

2.8% B. P.=48–49° C., propionaldehyde
14.6% B. P.=86–88° C., allyl alcohol-water (azeotrope)
51.7% B. P.=96.9° C., allyl alcohol
2.2% B. P.=20–36° C., methyl-ethyl-acrolein 14.5 mm. Hg.

26.1% distillation residue having the following characteristic values:

Iodine number _____ 130
Hydroxyl number _____ 65
CO number _____ 520
Saponification number _____ 170

The distillation residue was a reddish-brown oil which dried in air to form a hard resinous film.

Example IV 60 cc. of the acetic acid ester of sperm oil alcohols were heated in a shaker autoclave for 6 hours at 170° C. in an atmosphere of carbon monoxide at a pressure of 150 kg./cm.$^2$ and in the presence of 5 grams of powdered metallic cobalt, accompanied by vigorous shaking. The cobalt had previously been treated in a reducing atmosphere of hydrogen at 300° C. for 5 hours. After purifying the raw product as described in Example I, it was distilled. The cobalt carbonyl treatment did not materially change the boiling point of the various fractions. The melting point of the ester, however, was increased from −6° C. to +4° C. The characteristic values of the starting material and the product were as follows:

|  | Acid No. | Saponif. No. | Iodine No. | Hydroxyl No. | CO No. |
|---|---|---|---|---|---|
| Before treatment | 0.5 | 174 | 71.6 | 0 | 2 |
| After treatment | 0.6 | 172 | 66 | 10 | 6 |

Example V 1500 grams of fatty alcohols, produced by reducing sperm oil with metallic sodium, were admixed with 10 grams of cobalt carbonyl dissolved in benzene. The resulting mixture was heated for 3 hours in an agitator autoclave made of V4A steel at a temperature of 180–190° C. in an atmosphere of carbon monoxide at a pressure of 150 kg./cm.$^2$. After cooling, the pressure was released and the raw product was washed several times with dilute nitric acid to remove the dissolved cobalt carbonyl. Thereafter, the acid product was washed with water until neutral and dried. As compared with the starting material, the neutral raw product had the following characteristic values:

|  | Acid No. | Saponif. No. | Iodine No. | Hydroxyl No. | CO No. | Melting Pt. °C. | Molecular weight |
|---|---|---|---|---|---|---|---|
| Reaction product | 1 | 12 | 35 | 70 | 49 | 23.5 | 368 |
| Starting material | 1 | 8.6 | 68.7 | 238 | 3 | 18 | 252 |

The neutral reaction product was then divided into 4 fractions by distillation, and each fraction was analyzed. The values obtained thereby are shown in the following table:

| Fraction | Amount, percent | Boiling range mm. Hg | Boiling range °C. | Iodine No. | Hydroxyl No. | CO No. | Melting Pt., °C. |
|---|---|---|---|---|---|---|---|
| 1 | 12.5 | 5 | up to 150 | 17.6 | 211.0 | 13.5 | 7.5 |
| 2 | 32.5 | 5 | 150–195 | 33.4 | 206.5 | 11.5 | 31.5 |
| 3 | 21.4 | 1.3 | 195–270 | 70.4 | 37.5 | 40.0 | 30.5 |
| 4 | 33.4 | 1.3 | above 270 | 64.2 | 5.9 | 16.6 | 23.0 |

Wherever used in the present specification and claims, the term "cobalt carbonyl" is intended to designate that compound or those mixtures of compounds which are formed when carbon monoxide is heated with metallic cobalt in the absence of other reacting substances.

While we have given certain specific embodiments of our invention, it will be understood that the invention is not limited to such embodiments, and that various changes and modifications can be made therein without departing from the spirit of the invention or the scope of the appended claims.

We claim:

1. The process of isomerizing an unsaturated alcohol having from 3 to 26 carbon atoms in the molecule, which comprises admixing said alcohol with a material selected from the group consisting of cobalt and cobalt carbonyl, heating the resulting mixture in a substantially oxygen-free atmosphere of carbon monoxide at elevated pressures to a temperature between 100° C. and 300° C. while maintaining said pressure at a value greater than the dissociation pressure of cobalt carbonyl at the prevailing temperature.

2. The process of isomerizing an unsaturated alcohol having from 3 to 26 carbon atoms in the molecule, which comprises heating said alcohol in a substantially oxygen-free atmosphere of carbon monoxide at a pressure from 30 kg./cm.$^2$ to 150 kg./cm.$^2$ and in the presence of cobalt carbonyl to a temperature between 100° C. and 300° C. while maintaining said pressure at a value greater than the dissociation pressure of cobalt carbonyl at the prevailing temperature.

3. The process of isomerizing an unsaturated alcohol having 3 to 26 carbon atoms in the molecule, which comprises admixing said alcohol with cobalt deposited upon an inert carrier substance, and heating the resulting mixture in a substantially oxygen-free atmosphere of carbon monoxide at an elevated pressure and in the presence of cobalt carbonyl to a temperature between 100° C. and 300° C. while maintaining said pressure at a value greater than the dissociation pressure of cobalt carbonyl at the prevailing temperature.

4. A process for the isomerization of unsaturated sperm oil alcohols which comprises admixing unsaturated sperm oil alcohols with a cobalt catalyst composed of cobalt, thorium oxide, magnesium oxide and kieselguhr in a ratio of 100:5:6:200, heating the resulting mixture to 180° C. in a substantially oxygen-free atmosphere of carbon monoxyl at a pressure of 150 kg./cm.$^2$, separating the resulting product from the catalyst composition, washing the separated product with dilute sulfuric acid and washing the acid product with water until substantially neutral.

5. A process for the isomerization of unsaturated sperm oil alcohols which comprises admixing sperm oil containing unsaturated fatty alcohols with a cobalt catalyst composed of cobalt, thorium oxide, magnesium oxide and kieselguhr in a ratio of 100:5:6:200, heating the resulting mixture at 180° to 190° C. in a substantially oxygen-free atmosphere of carbon monoxide at a pressure of 150 kg./cm.$^2$, separating the resulting product from the catalyst composition, washing the separated product with dilute sulfuric acid and washing the acid product with water until substantially neutral.

6. A process for the isomerization of allyl alcohol which comprises heating allyl alcohol to 170° C. in a substantially oxygen-free atmosphere of carbon monoxide at a pressure at 140 kg./cm.$^2$ and in the presence of a cobalt catalyst composed of cobalt, thorium oxide, magnesium oxide and kieselguhr in a ratio of 100:5:6:200, and separating the resulting product from the reaction mixture.

7. A process for the isomerization of unsaturated olefinic alcohols obtained from sperm oil, which comprises heating said olcohols to a temperature between 180° and 190° C. in a substantially oxygen-free atmosphere of carbon monoxide at a pressure of 150 kg./cm.$^2$ and in the presence of cobalt carbonyl, washing the resulting product with dilute nitric acid, washing the acid product with water until substantially neutral, and drying the neutral product.

References Cited in the file of this patent

Willemart: Bull. Soc. Chim., France, pp. 155–6 (1947).